Patented Sept. 9, 1941

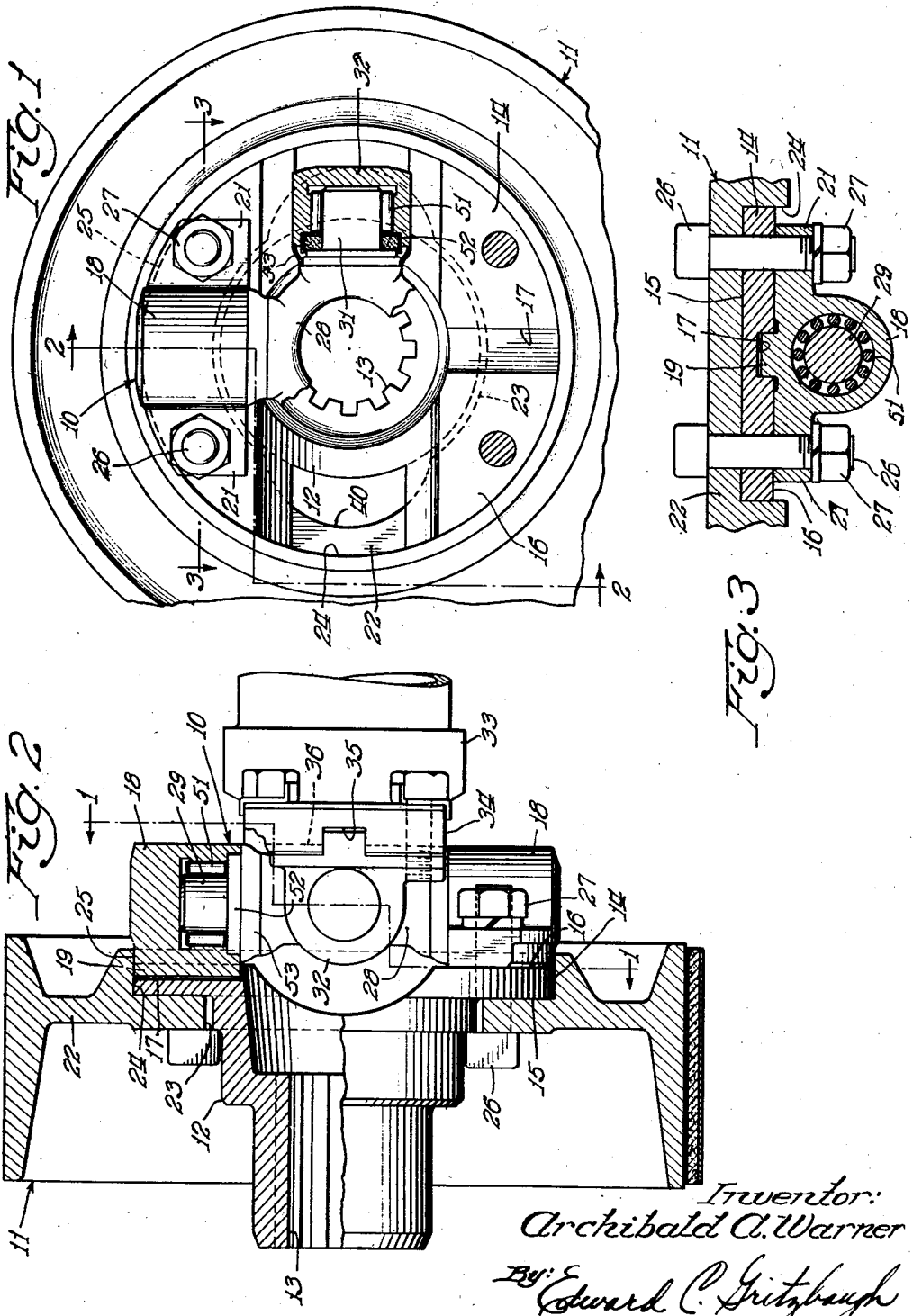

2,255,604

UNITED STATES PATENT OFFICE 2,255,604

UNIVERSAL JOINT AND BRAKE DRUM ASSEMBLY

Archibald A. Warner, Rockford, Ill., assignor to Borg-Warner Corporation, Chicago, Ill., a corporation of Illinois Application May 12, 1939, Serial No. 273,213

4 Claims. (Cl. 64—17)

This invention relates to a universal joint and brake drum assembly.

It is an object to provide an improved assembly with respect to compactness, economy of manufacture and efficiency of operation.

It is a more particular object to provide a universal joint and brake drum assembly that is particularly constructed with reference to balancing the same prior to installation on the car, thus facilitating the automobile manufacturers' assembly problem.

It is another particular object to provide a universal joint and brake drum assembly wherein the brake drum web is provided with means defining arcuate pilot shoulders for determining the radial outward position of the bearing cups.

Other and more particular objects, uses and advantages of my invention will become apparent from a reading of the following specification taken in connection wtih the accompanying drawing which forms a part thereof and wherein:

Fig. 1 is an end view partially in section of an assembly in accordance with my invention taken substantially on line 1—1 of Fig. 2;

Fig. 2 is a partial vertical section taken substantially on the line 2—2 of Fig. 1; and Fig. 3 is a broken-away section view taken substantially on the line 3—3 of Fig. 1.

My invention consists essentially in satisfying the demand for compactness by providing a novel arrangement of universal joint and emergency brake drum, including mounting the brake drum on one yoke of the universal joint in a novel manner. More specifically my invention includes providing in addition to the above arrangement, means carried by the brake drum web which means defines arcuate pilot shoulders for limiting the outward radial position of the bearing cups. With this compact assembly, the splined socket of the forward or short yoke may be connected to the transmission output shaft directly adjacent the transmission housing. The present more compact arrangement produces an improved dynamic balance by virtue of bringing the joint more closely adjacent the transmission and by virtue of the flywheel effect produced by the brake drum being mounted on the forward yoke. The axially extending shoulder for defining the radial outward position of the bearing cups is readily and economically formed on the brake drum web by a simple turning operation.

Referring now in greater detail to the figures of the drawing, I have illustrated a universal joint of the immediate pivotal member type indicated at 10 on the forward yoke of which it is mounted in a novel manner, an emergency brake drum indicated generally at 11. Universal joint 10 comprises substantially a forward or short yoke 12 having internal splines 13 for attachment to a transmission power shaft closely adjacent to the transmission housing. Short yoke 12 is formed on the opposite end thereof with radially oppositely extending yoke arms or flanges 14 having a forward substantially plane face 15 and a rear substantially plane face 16. A keyway 17 is recessed in rear face 16 of each yoke arm 14, these key-ways lying along a line passing through the axes of rotation of yoke 12. Mounted on the rear faces 16 of arms 14 are bearing cups or blocks 18 formed with keys 19 on the sides thereof for cooperation with key-ways 17 and provided further with oppositely extending attaching flanges 21.

Radially inwardly extending web 22 of brake drum 11 is centrally orificed at 23 to provide for the reception of web 22 about the rear portion of yoke 12 and in contact with forward faces 15 of arms 14. Web 22 is further formed with arcuate shoulder 24 overlapping the outer edge 25 of bearing cups 18 which functions to determine the outer radial position of the bearing cups.

The arcuate shoulder 24 may be readily provided on web 22 by casting the same integral with the web or in any well-known manner and subsequently turned on a lathe to effect the requisite precise centering. The arcuate complementary cooperating surfaces 25 on the outer ends of the bearing cups 18 are preferably formed in accordance with the teaching of Swenson Patent No. 1,985,531, which includes mounting these cups for rotation in a lathe relative to a grinding member. Since the particular manner in which these complementary surfaces are provided does not alone constitute part of the present invention, no further description thereof is deemed necessary.

The brake drum web 22, yoke arms 14 and bearing cups 18 are held in assembled relationship by means of bolts 26 passing through all three of these elements and fastened in place by means of nuts 27. It will be understood that the openings through flanges 21 of bearing cups 18 for receiving nuts 26 are enlarged radially of the axis of rotation of the joint to provide for the movement of surface 25 of the bearing cups closely into engagement with shoulder 24.

In addition to the above structure there is provided the usual arrangement of intermediate pivotal member or spider 28 provided with one pair of oppositely extending trunnions 29 received in bearing cups 18 and a second pair of axially extending trunnions 31 spaced 90 degrees from trunnions 29 and received in bearing cups 32 of a second yoke member 33 usually referred to as the slip-yoke. Yoke 33 is adapted to be connected to the propeller shaft. Bearing cups 32 are mounted on oppositely extending arms 34 of slip-yoke 33 and may be formed in any well-known manner, such for example as that disclosed in Swenson Patent No. 1,985,531. This includes the provision of a key-way 35 in arms 34 as well as arcuate shoulders indicated in dotted lines at 36. The key-way relationship provides for the removal of at least a portion of the torque load from the attaching bolts of the arcuate shoulders 36 and prevents the radial outward movement of the cups relative to the arms 34. Bearing cups 32 are attached to yoke arms 34 by means of bolts 31 locked in place by means of lockwashers 42.

Web 22 of brake drum 11 is further arcuately recessed as indicated at 40 to provide for the relative movement of universal joint elements including bearing cups 32.

Brake drum 11 is of course in practice arranged to be engaged by a suitable brake band indicated at 33 the operating means for which is omitted since the same forms no part of the present invention.

While I have indicated and prefer to use antifriction needle bearings 51 and an oil seal construction indicated generally at 52 and 53, it is to be understood that this taken alone forms no part of the present invention.

While I have disclosed my invention in connection with a specific embodiment thereof, I nevertheless contemplate equivalent construction and desire that my invention be defined by the appended claims which should be given a scope as broad as permitted by the prior art.

I claim:

1. A compact universal joint and brake drum assembly comprising a universal joint yoke having oppositely extending yoke arms, bearing cups associated with said yoke arms adapted to receive oppositely extending spider trunnions, said drum being provided with a radially inwardly extending centrally orificed web embracingly received about said yoke, said web being further provided with means defining arcuate pilot shoulders adapted to be engaged by said cups for determining the outermost radial position thereof, and means for attaching in assembled relation said web, yoke arms, and bearing cups.

2. A compact universal joint and brake drum assembly comprising a universal joint yoke including oppositely extending yoke arms, bearing cups associated with said yoke arms adapted to receive oppositely extending spider trunnions, and provided with oppositely extending attaching flanges, said drum being provided with a radially inwardly extending centrally orificed web embracingly received about said yoke, said web being further provided with means defining arcuate pilot shoulders adapted to be engaged by said cups for determining the outward radial position thereof, said web, yoke arms, and bearing cup attaching flanges being complementarily orificed for the reception of attaching bolts extending therethrough for fastening the same together in assembled relation.

3. In a compact universal joint and brake drum assembly, a universal joint yoke including radially oppositely extending yoke arms, separate bearing cups adapted to be mounted on said yoke arms for receiving oppositely extending spider trunnions, said brake drum being provided with a radially inwardly extending centrally orificed web embracingly received about said joint yoke, said brake drum being particularly characterized by the formation thereon of means cooperating with complementary means formed on said joint yoke for centering said drum with reference to the axis of said yoke and for limiting the radial outward position of said bearing cups, said last named positions being equi-distances from the axis of said yoke.

4. In a compact universal assembly a universal joint yoke including oppositely extending yoke arms, the forward face of each of said arms being formed with a keyway extending radially through to the end of said respective arms from correspondingly located points on opposite sides of the axis of said yoke, a pair of bearing cups adapted to be received in engagement with each of said faces and having complementarily formed splines for reception in said keyways, the combination therewith of a brake drum having a radially inwardly extending flange formed with the central orifice embracingly received about said yoke, said flange being particularly characterized by the provision of means for limiting the radial outward position of said bearing cups to points equally distant from the axis of rotation of said yoke, and means for attaching said web, yoke arm, and bearing cups in assembled relation.

ARCHIBALD A. WARNER.